United States Patent [19]
Bacher et al.

[11] Patent Number: 5,419,634
[45] Date of Patent: May 30, 1995

[54] APPARATUS FOR FILTERING AND EXTRUDING SYNTHETIC PLASTIC SCRAP MATERIAL

[76] Inventors: Helmut Bacher, Bruck/Hausleiten 17; Helmuth Schulz, Badstrasse 20, both of St. Florian, Austria, A-4490; Georg Wendelin, Waldbothenweg 84, Linz, Austria, A-4033

[21] Appl. No.: 199,136

[22] PCT Filed: Aug. 6, 1992

[86] PCT No.: PCT/AT92/00110
   § 371 Date: Feb. 25, 1994
   § 102(e) Date: Feb. 25, 1994

[87] PCT Pub. No.: WO93/04841
   PCT Pub. Date: Mar. 18, 1993

[30] Foreign Application Priority Data
   Aug. 29, 1991 [AT] Austria .................................. 1709/91

[51] Int. Cl.⁶ .............................................. B29C 47/76
[52] U.S. Cl. ........................................... 366/75; 366/87; 366/88; 366/89; 425/203
[58] Field of Search ................. 366/75, 79, 81, 87, 366/88, 89, 91, 302, 318, 321, 323; 425/203, 205, 208, 209

[56] References Cited

U.S. PATENT DOCUMENTS

| | | | |
|---|---|---|---|
| 3,193,877 | 7/1965 | Edwards ........................... | 366/75 |
| 3,360,824 | 1/1968 | Schippers ....................... | 366/87 X |
| 4,902,455 | 2/1990 | Wobbe .............................. | 366/75 X |

FOREIGN PATENT DOCUMENTS

92898 1/1969 France.
1579277 8/1969 France.

*Primary Examiner*—Charles E. Cooley
*Attorney, Agent, or Firm*—Salter & Michaelson

[57] ABSTRACT

An apparatus for filtering and extruding plastic scrap consists of an extruder housing having an interior chamber and an extruder worm received and supported for axial rotation in the chamber. The extruder worm includes a centrally located set of return threads which divide the chamber into first and second chamber portions. The housing further includes an intake opening in the first chamber portion for receiving raw material, an exit opening in the second chamber portion for discharging filtered material, and a degassing opening in the second chamber portion for discharging gasses from the chamber. A drive mechanism is provided for rotating the extruder worm. A filter channel connects the first and second chamber portions wherein the plastic material passes from the first chamber portion to the second chamber portion through the channel. The channel has an inlet opening in the first chamber portion and an outlet opening in the second chamber portion. The degassing opening is preferably located between the outlet opening of the channel and the exit opening of the chamber. A filter is disposed in the channel for filtering the plastic material as it passes therethrough. The extruder worm has a thread geometry in the second chamber portion which creates a no pressure zone therein. The no pressure zone is preferably located between first and second ends of said second chamber portion.

10 Claims, 1 Drawing Sheet

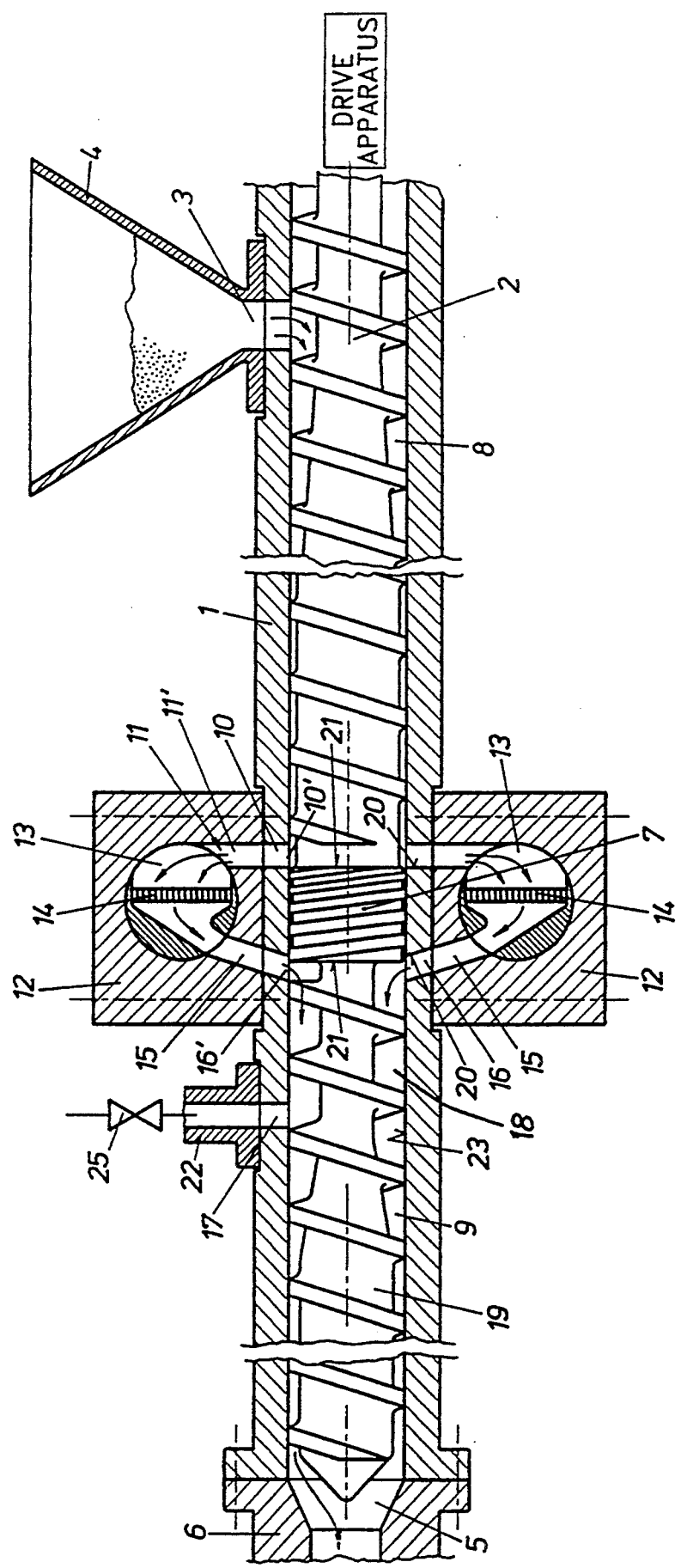

APPARATUS FOR FILTERING AND EXTRUDING SYNTHETIC PLASTIC SCRAP MATERIAL

BACKGROUND AND SUMMARY OF THE INVENTION

The invention relates to an apparatus for extruding thermoplastic synthetic plastics material, comprising an extruder housing in which an extruder worm driven by a drive means is bearingly supported for rotation around its axis, said housing being provided with an intake opening for the material to be plasticized, which opening, for example, is connected to a funnel, and with an exit opening for the melt disposed in axial distance from the intake opening and with at least one degasing opening for the escape of gases, and with at least one melt filter through which the melt passes, wherein the extruder housing is divided into two chambers by return screw threads disposed on the circumference of the worm, one of which chambers being provided with the intake opening and the other being provided with the exit opening, which chambers being interconnected by at least one channel in which the melt filter is disposed, and wherein each degasing opening is connected to the chamber provided with the exit opening and is disposed in axial distance from this exit opening, in which chamber the extruder worm has a geometry of its threads that causes a no-pressure-zone.

Apparatus of this kind are known (U.S. Pat. No. A 3,380,824). The melt discharged through the exit opening is supplied to a tool, for example to a mold, by which articles of thermoplastic synthetic plastics material are produced.

It is also known to subject synthetic plastics material scrap to a recycling process by supplying the synthetic plastics material scrap through an intake opening into the extruder housing and to melt it therein and to separate the impurities from the melt by means of the filter. Within this, there occurs the problem that on the one hand, the impurities contained in the synthetic plastics material scrap must be removed, but on the other hand the gases released during plasticizing must be removed, which gases, for example, are created by the fact that printing colours adhering on the scrap synthetic plastics material release gaseous components at a certain temperature or are even entirely transformed into the gaseous condition. For the removal of such gaseous components, a degasing opening is provided within the known construction, which opening—when seen in flow direction of the synthetic plastics material—is disposed immediately behind the screen constituting the filter. The purified and degased synthetic plastics material is then introduced into the second chamber and is conveyed through this towards the exit opening. Investigations have shown that such an apparatus does not meet the requirements. The investigations have shown that degasing of the treated synthetic plastics material is not sufficient, since the synthetic plastics material is subjected to turbulences when passing through the filter, whereby gaseous components which optionally have already been released from the synthetic plastics material or are ready for such a release, are worked in again into the synthetic plastics material mass.

In a one-part-worm, which, therefore, is disposed in one single chamber, it is also known to dispose a filter purifying the synthetic plastics material immediately before the exit opening. Within this, the degasing openings are disposed before the filter, so that the melt contains impurities also after degasing. In front of the filter or, respectively, of the exit opening, the extruder worm must have such a lead that the required conveying pressure is created in order to overcome the resistances caused by the filter and by the tool connected to the exit opening. Therefore, it depends from the geometry of the extruder worm in this section, which maximum resistance can be overcome. If this maximum resistance is exceeded, for example due to soiled filter screens, the output of the melt through the exit opening is decreased and there results a back pressure of the melt that causes an undesired exit of the melt through the degasing openings.

Other known apparatus show still further disadvantages. Thus, the use of fine-meshed filter screens as it is suitable for the production of final products of high quality, depends from the melt viscosity of the synthetic plastics material, from the entire filter surface and from the throughput, and is limited therefore. Further, within the known apparatus, gases may be produced by the impurities contained in the melt after this melt has passed the degasing openings, so that then a final product is obtained which is not completely degased. The same holds for inhomogenities in the melt which pass the degasing openings in a not molten condition and are molten only later on, so that they start to degase only then.

The present invention has at its object to avoid the disadvantages of the known apparatus and to provide an apparatus for the extrusion of thermoplastic synthetic plastics material in which no material leaves the degasing openings and in which all impurities and inhomogenities are filtered out already before the degasing operation, which apparatus, however, provides for a reliable degasing of the synthetic plastics material. The invention solves this task, starting from the initially described known apparatus, by the features, that each degasing opening—when seen in conveying direction of the synthetic plastics material—is disposed behind the junction of each channel and of the chamber provided with the exit opening, the no-pressure-zone being disposed between this junction and the degasing opening, and that the junction of each channel and of the chamber provided with the exit opening is disposed immediately adjacent the return screw threads. Degasing of the synthetic plastics material, therefore, occurs only at a time at which the synthetic plastics material, after having passed the melt filter, has been introduced again into the worm housing. From the moment of passing the melt filter till the moment at which the synthetic plastics material reaches the degasing opening or the degasing openings, the gases contained in the synthetic plastics material have sufficient time to escape from the synthetic plastics material, inasmuch during this time interval the synthetic plastics material is not subjected to a substantial pressure because during this time interval it is disposed within the no-pressure-zone of the extruder worm, which zone according to the invention—when seen in flow direction of the synthetic plastics material—is disposed before the degasing openings, however, within the initially described apparatus it is disposed behind the degasing opening.

To dispose the mouths by which each channel leads the filtered synthetic plastics material into the chamber leading to the exit opening immediately adjacent the return screw threads, ensures that synthetic plastics material is reliably supplied to the return screw threads.

This advantage is not given within the initially described known construction, because there the opening through which the filtered material is introduced again into the worm housing, is displaced for about half a lead of the screw threads of the extruder screw. Therefore, the extruder screw tends to convey the material away from the return screw threads, so that the return screw threads cannot sufficiently be supplied with synthetic plastics material. This has as a consequence, that the two chambers are not reliably tightened relative to each other and there is the danger that the return screw threads run dry. Within the inventive construction, it is ensured that these disadvantages are avoided, and, in addition, the advantage is obtained that the leads of the return screw threads are always cleaned by already filtered material, so that in the region of the return screw threads no cracking of the synthetic plastics material can occur.

By disposing the degasing openings spaced apart from the synthetic plastics material filters or, respectively, by the thereby obtained degasing of the synthetic plastics material only at a substantially later moment as that at which the melt passes the melt filter, the advantage is obtained that in case of an eventual back pressure due to blocking of a melt filter, no material can escape through the degasing openings. By the fact that inhomogenities and impurities are removed from the melt before it reaches the degasing openings, it is also avoided that further gases are created after passing these degasing openings. Lastly, the inventive construction shows the advantage that the feed pressure on the melt in the region of the exit opening is reduced, since only the resistance of the tool must be overcome.

As it is well known, return screw threads are tightening screw threads having a small lead of opposite hand with respect to the worm threads. By these return screw threads a small amount, for example about 1 to 1.5%, of the melt is conveyed in return direction from the chamber provided with the exit opening and the degasing openings into the chamber provided with the intake opening. Thereby it is avoided in any case that synthetic plastics material containing impurities can reach the chamber provided with the exit opening and the degasing openings directly, by by-passing the melt filter.

According to a preferred embodiment of the invention also the inlet opening of each channel leading from the chamber provided with the intake opening to a melt filter, is disposed immediately adjacent the return screw threads. Thereby dead corners are avoided in which the synthetic plastics material may collect and may stay within the apparatus for a longer time so that the synthetic plastics material may be subjected to thermic deteriorations.

According to a preferred embodiment of the invention, the no-pressure-zone of the extruder worm extends up to the degasing openings, the extruder worm being provided in connection to this zone of no-pressure with a geometry of its threads that causes a discharging zone extending up to the exit opening. In such a manner, maximum time is given to the synthetic plastics material for the release to degas, and, on the other hand, it is ensured at the exit opening that the melt is fed there into the tool with the necessary pressure. Suitably, the no-pressure-zone immediately neighbours the mouth of the channel that leads into the chamber provided with the exit opening, in order to ensure a maximum length of the no-pressure-zone.

In order to make the apparatus suitable also for processing such kinds of synthetic plastics material which do not require a degasing operation, according to a further embodiment of the invention at least one degasing opening is adapted to be closed.

In order to avoid dead corners, it is suitable within the spirit of the invention, if the wall of the inlet opening or, respectively, of the mouth of the channel is flush with the front surface of that section of the extruder worm that is provided with the return screw threads.

In order to ensure a simple possibility for producing those sections of a channel which intersect the extruder housing, it is suitable within the spirit of the invention that those channel sections that are provided with the inlet openings or, respectively, with the mouths, extend radially in the extruder housing.

BRIEF DESCRIPTION OF THE DRAWING

In the drawing, the invention is schematically shown by way of an exemplative embodiment which shows the inventive apparatus in a longidutinal section.

DESCRIPTION OF THE PREFERRED EMBODIMENT

This apparatus comprises an extruder housing 1 in which an extruder worm 2, driven by a suitable drive means (24), is bearingly supported by the housing 1 for rotation around its axis. The synthetic plastics material to be plasticized is supplied to the extruder worm through an intake opening 3 connected to an intake hopper 4. The melt formed by this plasticizing leaves the housing 1 via an exit opening 5 to which a tool 8 is connected.

In an axial distance spaced apart from the intake opening 3 and from the exit opening 5, the worm 2 is provided with return screw threads 7 which comprise screw threads of opposite thread pitch that is less than the pitch of the worm 2 and constitutes a tightening between the periphery of the worm 2 and the inner wall of the extruder housing 1, so that in this extruder housing two chambers 8,9 are formed. In the chamber 8 that is in connection with the intake opening 3, the extruder worm has such a configuration (depth of the threads, pitch) that the synthetic plastics material is plasticized and that the pressure required for overcoming the filter resistance is built up. At the end of the chamber 8, immediately neighbouring the return screw threads 7, mouths 10' of radially extending channel sections 10 are provided in the wall of the extruder housing 1, which channel sections intersect the wall of the extruder housing 1 and are connected to sections 11' of channels 11 in filter housings 12 fixed to the extruder housing 1. Each filter housing 12 comprises a hollow space 13 into which the respective channel section 11' discharges. At least one melt filter 14 is provided in each hollow space, which filter may be of any desired construction. Thus, the melt filter may be formed of one or more screens, thus may be of one piece or multi-part, and also a plurality of filter means may be disposed one after the other. Suitably filters are used that are backwashable and can be transferred into a screen exchange position.

After having passed the melt filter 14, the melt flows from the hollow space 13 into further channel sections 15 of the filter housing 12 and from there via radially extending channel sections 16 intersecting the extruder housing 1, into the chamber 9. The mouths 16' of the channel sections 16 are disposed immediately neighbouring the return screw threads 7. That wall 20 of the channel sections 10, 16 neighbouring the return screw threads 7, may be flush with the front surface 21 of the return screw threads 7.

One or more degasing openings 17 are provided in the chamber 9 spaced apart in an axial distance from the mouths 16' of the channel sections 16, through which degasing openings gases can be drawn off which are released from the treated synthetic plastics material, preferably by means of a vacuum pump connected via a line 22 to the degasing opening 17. These degasing openings 17 may also provided with suitable closure means 25. Such a closure of a degasing openings 17 is made, if synthetic plastics material is processed at which no gases are created. In that section of the length of the chamber 9 which is disposed between the mouths 16' of the channels 15 and the degasing openings 17, the extruder worm 2 is provided with a section of such geometry that a no-pressure-zone 18 is formed that constitutes a tension-release space for the synthetic plastics material, so that degasing is enhanced. As it is shown in the drawing, the worm 2 is provided in this section suitably with a considerable increased depth of its threads. The synthetic plastics material supplied via the mouths 16', therefore, is substantially only conveyed in this no-pressure-zone 18, but is not substantially pressurized. Therefore, the gases contained in the synthetic plastics material have sufficient time to leave the synthetic plastics material and to reach the periphery of the worm 2, that is the inner wall 23 of the extruder housing 1, from where the gases can escape through the degasing openings 17. Simultaneously it is avoided thereby that synthetic plastics material melt discharges in an undesired manner from the chamber 9 through the degasing openings 17.

Following the no-pressure-zone 18, the extruder worm 2 comprises a discharge zone 19 having a less depth of its threads in comparison with the no-pressure-zone 18, in which discharge zone 19 the pressure necessary to overcome the resistance of the tool 6 is built up.

By the return screw threads 7 a small amount of melt is conveyed back from the chamber 9 into the chamber 8, whereby it is reliably avoided that melt can reach the chamber 9 from the chamber 8 by by-passing the melt filter 14, whereby impurities and inhomogenities could be supplied to the tool 6.

Each filter housing 12 shown in the drawing in a schematic manner only, can be loosened in a simple manner from the extruder housing 1 and can be disassembled for cleaning or, respectively, for replacement of the melt filters 14.

According to a preferred variant of the embodiment, the front surface 21 of that section of the extruder worm 2 which is provided with the return screw threads 7, protrudes into the mouths 16'. The distance, for which this front surface 21 protrudes into the mouths 16' is very small only in order to avoid that the mouth 16' is unnecessarily covered. The said distance may amount to only one thread of the return screw threads 7, or to only one fraction thereof. Already by such a small overlapping it is ensured that the last thread of the return screw thread 7 reliably takes along filtered synthetic plastics material. In such a manner it is ensured that the return screw threads 7 constitute a perfect tightening and are continuously cleaned by fresh filtered synthetic plastics material.

What is claimed is:

1. Apparatus for processing synthetic plastic scrap material comprising:

a housing having a cylindrical interior chamber;

an extruder worm received and supported in said chamber for rotation around an axis, said extruder worm including a centrally located set of return threads on the circumferential surface thereof which divide said chamber into first and second chamber portions, said housing further including an intake opening in said first chamber portion for receiving raw material, an exit opening in said second chamber portion for discharging processed material, and a degassing opening in said second chamber portion for discharging gasses from said chamber;

drive means for driving said extruder worm;

a channel connecting said first and second chamber portions, said plastic material passing from said first chamber portion to said second chamber portion through said channel, said channel having an inlet opening in said first chamber portion and an outlet opening in said second chamber portion immediately adjacent said return threads, said degassing opening being located between said outlet opening of said channel and said exit opening of said second chamber portion; and filter means disposed in said channel for filtering said plastic material as it passes therethrough, said extruder worm having a thread geometry in said second chamber portion which creates a no-pressure zone therein, said no-pressure zone being located between first and second ends of said second chamber portion.

2. The apparatus of claim 1 wherein said inlet opening of said channel is located at a second end of said first chamber portion immediately adjacent said return threads.

3. The apparatus of claim 1 wherein said degassing opening is located within said no-pressure zone.

4. The apparatus of claim 1 wherein said extruder worm in said second chamber portion has a further thread geometry for moving said material from said no-pressure zone to said exit opening.

5. The apparatus of claim 1 wherein said no-pressure zone is located immediately adjacent said outlet opening of said channel.

6. The apparatus of claim 1 further comprising means for closing said degassing opening.

7. The apparatus of claim 1 wherein said inlet opening of said channel is flush with a surface of said extruder formed by said return threads.

8. The apparatus of claim 1 wherein said inlet and outlet openings of said channel extend radially inwardly into a respective one of said chamber portions.

9. The apparatus of claim 1 wherein said outlet opening of said channel partially overlaps said return threads of said extruder.

10. Apparatus for processing synthetic plastic scrap material comprising:

a housing having an interior chamber;

a worm received and supported in said chamber for rotation around an axis, said worm including a centrally located set of return threads which divide said chamber into first and second chamber portions, said housing further including an intake opening in said first chamber portion, an exit opening in said second chamber portion, and a degassing opening in said second chamber portion;

drive means for rotating said worm;

a channel connecting said first and second chamber portions, said plastic material passing from said first chamber portion to said second chamber portion through said channel, said channel having an inlet opening in said first chamber portion and an outlet opening in said second chamber portion, said degassing opening being located between said outlet opening of said channel and said exit opening of said second chamber portion; and filter means disposed in said channel for filtering said plastic material as it passes therethrough, said worm having a thread geometry in said second chamber portion which creates a no-pressure zone therein, said no-pressure zone being located between first and second ends of said second chamber portion.

* * * * *